US011831732B2

(12) United States Patent
Singh et al.

(10) Patent No.: US 11,831,732 B2
(45) Date of Patent: Nov. 28, 2023

(54) METHODS, SYSTEMS, AND COMPUTER READABLE MEDIA FOR GENERATING, CONVEYING, AND USING ATTEMPTED PRODUCER NETWORK FUNCTION (NF) INSTANCE COMMUNICATION INFORMATION

(71) Applicant: Oracle International Corporation, Redwood Shores, CA (US)

(72) Inventors: Virendra Singh, Bangalore (IN); Jay Rajput, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/524,711

(22) Filed: Nov. 11, 2021

(65) Prior Publication Data

US 2023/0147549 A1 May 11, 2023

(51) Int. Cl.
*H04L 67/51* (2022.01)
*H04L 41/06* (2022.01)
*H04L 67/56* (2022.01)

(52) U.S. Cl.
CPC .............. *H04L 67/51* (2022.05); *H04L 41/06* (2013.01); *H04L 67/56* (2022.05)

(58) Field of Classification Search
CPC .......... H04L 67/51; H04L 41/06; H04L 67/56
See application file for complete search history.

(56) References Cited

U.S. PATENT DOCUMENTS

| 11,290,549 B2 | 3/2022 | Krishan | |
|---|---|---|---|
| 2021/0306203 A1* | 9/2021 | Landais | H04L 67/63 |
| 2022/0224589 A1* | 7/2022 | Das | H04L 63/0807 |
| 2022/0224760 A1* | 7/2022 | Foti | H04L 65/1016 |

(Continued)

OTHER PUBLICATIONS

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

(Continued)

*Primary Examiner* — Sm A Rahman
(74) *Attorney, Agent, or Firm* — Jenkins, Taylor & Hunt, P.A.

(57) ABSTRACT

A method for generating, conveying, and using attempted producer network function (NF) instance communication information includes, at a first service communication proxy (SCP), receiving, from a sender, a first service based interface (SBI) request message. The method further includes attempting to obtain a service requested by the first SBI request message from at least one producer NF instance. The method further includes receiving at least one error response or failing to receive a response from the at least one producer NF instance. The method further includes generating, from the at least one error response or the failing to receive a response from the at least one producer NF instance, attempted producer NF instance communication information. The method further includes communicating, to the sender, the attempted producer NF instance communication information.

16 Claims, 9 Drawing Sheets

(56) References Cited

U.S. PATENT DOCUMENTS

2022/0345379 A1* 10/2022 Li ..................... H04L 41/5058

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1, pp. 1-78 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

* cited by examiner

METHODS, SYSTEMS, AND COMPUTER READABLE MEDIA FOR GENERATING, CONVEYING, AND USING ATTEMPTED PRODUCER NETWORK FUNCTION (NF) INSTANCE COMMUNICATION INFORMATION

TECHNICAL FIELD

The subject matter described herein relates to obtaining an using attempted NF communication information in a network. More particularly, the subject matter described herein includes methods, systems, and computer readable media for conveying attempted producer NF instance communication information and using the attempted producer NF instance communication information in selecting producer NF instances to handle service based interface (SBI) requests.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur during indirect communications is that communications may be repeatedly re-attempted with producer NF instances even when the producer NF instances respond with application errors or for which responses are not received. For example, a consumer NF or an SCP serving the consumer NF may send a service based interface (SBI) request to a producer NF instance served by a different SCP, which will be referred to herein as the producer SCP. The producer SCP may attempt to contact one of the producer NF instances, which responds with an application error. If the producer SCP is configured for reselection/rerouting, the producer SCP may attempt to contact alternate NF instances to obtain the service until a success response is received or until error responses are received from all of the NF instances in an NF set and/or response timeouts occur for communications attempted with all NF instances in the NF set. The producer SCP sends a response to the SBI request message to the consumer NF or SCP that originated the request. The response does not carry information about the NF instances with which communication was attempted but from which error responses were received or from which responses were not received. As a result, the consumer NF or consumer SCP may re-attempt communication with the NF instances from which error responses were received or from which no responses were received, which is inefficient and results in unnecessary network traffic.

In another example, the consumer SCP may send a reattempt to obtain the service requested by the first SBI request message to a second producer SCP, which is separate from the first producer SCP that attempted communications with the producer NFs instances. Because the second producer SCP does not have the information about the NF communications attempted by the first producer SCP, the second producer SCP may reattempt communications with the producer NF instances from which error responses were received or from which no response was received, which is inefficient.

Accordingly, there exists a need for improved methods, systems and computer readable media for generating, conveying and using attempted producer NF instance communication information that avoids at least some of the aforementioned difficulties.

SUMMARY

A method for generating, conveying, and using attempted producer network function (NF) instance communication information includes, at a first service communication proxy (SCP), receiving, from a sender, a first service based interface (SBI) request message. The method further includes attempting to obtain a service requested by the first SBI request message from at least one producer NF instance. The method further includes receiving at least one error response or failing to receive a response from the at least one producer NF instance. The method further includes generating, from the at least one error response or the failing to receive a response from the at least one producer NF instance, attempted producer NF instance communication information. The method further includes communicating, to the sender, the attempted producer NF instance communication information.

According to another aspect of the subject matter described herein, the sender comprises a consumer NF and the method further comprises, at the consumer NF, using the attempted producer NF instance communication information to select a producer NF instance for handling a second SBI request message comprising a reattempt in obtaining a service requested by the first producer NF instance.

According to another aspect of the subject matter described herein, the method for generating, conveying, and using attempted producer NF instance communication information includes, at the consumer NF, transmitting the second SBI request message including the attempted producer NF instance communications information to a second SCP, and, at the second SCP, utilizing the attempted producer NF instance communication information to select a producer NF instance for providing the service requested by the second SBI request message, and transmitting the second SBI request message to the selected producer NF instance.

According to another aspect of the subject matter described herein, the sender comprises a second SCP and the method further comprises, at the second SCP, using the attempted producer NF instance communication information to select a producer NF instance for handling a second SBI request message comprising a reattempt in obtaining a service request message comprising a reattempt in obtaining a service requested by the first SBI request message and transmitting the second SBI request message including the attempted producer NF communications information to a third SCP.

According to another aspect of the subject matter described herein, the method for generating, conveying, and using attempted producer NF instance communication information includes, at the third SCP, utilizing the attempted producer NF instance communication information to select a producer NF instance for providing the service requested by the second SBI request message, and transmitting the second SBI request message to the selected producer NF instance.

According to another aspect of the subject matter described herein, communicating the attempted producer NF instance communication information to the sender includes communicating the attempted producer NF instance communication information in an error response transmitted to the sender.

According to another aspect of the subject matter described herein, communicating the attempted producer NF instance communication information in the error response includes including the attempted producer NF instance communication information in a server header of the error response.

According to another aspect of the subject matter described herein, including the attempted producer NF instance communication information in the server header includes including an NF instance ID of each of the at least one producer NF instances that responded with an error response or for which a response to the first SBI request message was not received.

According to another aspect of the subject matter described herein, the method for generating, conveying, and using attempted producer network function (NF) instance communication information includes, at the sender, generating a second SBI request message comprising a re-attempt to obtain the service requested by the first SBI request message.

According to another aspect of the subject matter described herein, the method for generating, conveying, and using attempted producer network function (NF) instance communication information includes, including, in the second SBI request message, a custom header including the attempted producer NF instance communication information.

According to another aspect of the subject matter described herein, a system for generating, conveying, and using attempted producer network function (NF) instance communication information is provided. The system includes a network node including at least one processor and a memory. The system further includes a service communication proxy (SCP) implemented using computer executable instructions stored in the memory and executed by the at least one processor for receiving, from a sender, a first service based interface (SBI) request message, attempting to obtain a service requested by the first SBI request message from at least one producer NF instance, receiving at least one error response or failing to receive a response from the at least one producer NF instance, generating, from the at least one error response or the failing to receive a response from the at least one producer NF instance, attempted producer NF instance communication information, and communicating, to the sender, the attempted producer NF instance communication information.

According to another aspect of the subject matter described herein the system includes the sender, the sender comprises a consumer NF, and the consumer NF is configured to use the attempted producer NF instance communication information to select a producer NF instance for handling a second SBI request message comprising a reattempt in obtaining a service requested by the first SBI request message.

According to another aspect of the subject matter described herein, the system comprises a second SCP, the consumer NF is configured to transmit the second SBI request message including the attempted producer NF communication information to the second SCP, and the second SCP is configured to utilize the attempted producer NF instance communication information to select a producer NF instance for providing the service requested by the second SBI request message and transmit the second SBI request message to the selected producer NF instance.

According to another aspect of the subject matter described herein, the system comprises the sender, and the sender comprises a second SCP configured to use the attempted producer NF instance communication information to select a producer NF instance for handling a second SBI request message comprising a reattempt in obtaining the service requested by the first SBI request message and transmit the second SBI request message including the attempted producer NF communications information to a third SCP.

According to another aspect of the subject matter described herein, the system comprises the third SCP, and the third SCP is configured to utilize the attempted producer NF instance communication information to select a producer NF instance for providing the service requested by the second SBI request message and transmit the second SBI request message to the selected producer NF instance.

According to another aspect of the subject matter described herein, the first SCP is configured to communicate the attempted producer NF instance communication information to the sender in an error response transmitted to the sender.

According to another aspect of the subject matter described herein, the first SCP is configured to include the attempted producer NF instance communication information in a server header of the error response.

According to another aspect of the subject matter described herein, the attempted producer NF instance communication information comprises an NF instance ID of each of the at least one producer NF instances that responded with an error response to the first SBI request message or for which a response to the first SBI request message was not received.

According to another aspect of the subject matter described herein, the system comprises the sender, and the sender is configured to generate a second SBI request message comprising a re-attempt to obtain the service requested by the first SBI request message, and, to include, in the second SBI request message, a custom header including the attempted producer NF instance communication information.

According to another aspect of the subject matter described herein, one or more non-transitory computer readable media comprising computer-executable instructions that when executed by a processor of a computer control the computer to perform steps is provided. The steps include receiving, from a sender, a first service based interface (SBI) request message. The system further includes attempting to obtain a service requested by the first SBI request message from at least one producer network function (NF) instance. The system further includes receiving at least one error response of failing to receive a response from the at least one producer NF instance. The system further includes generating, from the at least one error response or the failing to receive a response from the at least one producer NF instance, attempted producer NF instance communication information. The system further includes communicating, to the sender, the attempted producer NF instance communication information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
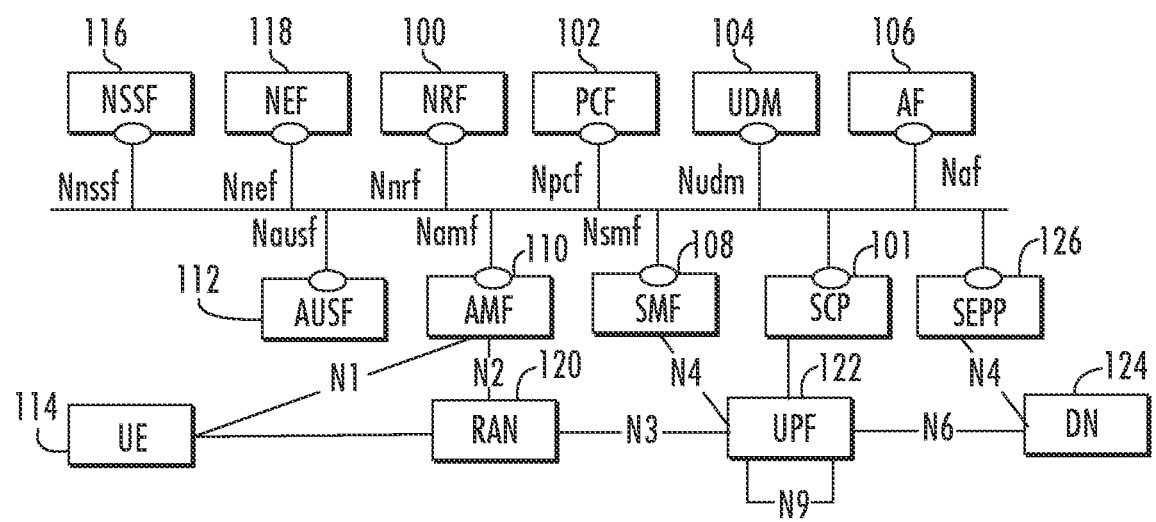
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that attempted producer NF instance communication information is not communicated to NF service consumers and SCPs to avoid re-selection of a service producer that sent an error message in response to a previous communication attempt. For example, Release 16 of 3GPP standards introduced 5G SBI indirect communication via service communication proxy (SCP), which can have multiple SCPs (SCP-SCP hops) between a 5GC consumer NF and 5GC producer NFs, resulting in multiple routes to reach a specific 5GC producer NF. In general, multiple retries to specific 5GC producer NF can occur due to operator defined rerouting policies at SCPs and network topology involving multiple SCPs. There is a need for optimized and efficient routing that avoids retries of a communication with a 5GC producer with which communication has already been attempted and which generated/ responded with an application error and/or from which a response was not received. The subject matter described herein includes a method to convey the already attempted 5GC producer NF communication information between SCP instances or between SCP instances and a consumer NF instance by enhancing the server header format to include already attempted 5GC producer NF instance Ids and, in the case of multiple SCP hops between a consumer NF instance and a producer NF instance, propagating the attempted producer NF instance communication information to an alternate selected producer SCP instance.

An SCP includes one or more of the following functionalities. Some or all of the SCP functionalities may be supported in a single instance of an SCP:
  indirect communication;
  delegated discovery;
  message forwarding and routing to destination NF/NF
    service;
  message forwarding and routing to a next hop SCP;
  communication security (e.g., authorization of the NF
    service consumer to access an NF service producer
    API, as specified in 3GPP TS 33.501;
  load balancing, monitoring, and overload control;
  Optional interaction with the UDR to resolve the UDM
    group ID, UDR group ID, AUSF group ID, PCF group
    ID, CHF group ID, home subscriber server (HSS)
    group ID based on UE identity, e.g., subscription
    permanent identifier (SUPI) or IP multimedia private
    identity/IP multimedia public identity (IMPI/IMPU).

In some instances, the SCP may be deployed in a distributed manner. In a distributed deployment, more than one SCP can be present in the communication path between NF service instances. SCPs can be deployed at the PLMN level, shared-slice level and slice-specific level. It is left to operator deployment to ensure that SCPs can communicate with relevant NRFs. In order to enable SCPs to route messages through several SCPs (i.e., next SCP hop discovery), an SCP may register its profile in the NRF. Alternatively, local configuration may be used. One point to highlight is that in some instances, 5GC indirect communication involves routing via multiple SCPs between 5GC consumer and producer NFs. Without the sharing of attempted producer NF instance communication information, the routing of SBI request messages can be inefficient due to multiple retries with producer NF instances that are reporting application errors and/or from which responses are not received.

One type of routing that is performed by SCPs is based on binding headers. Binding allows the NF producer to indicate that the NF consumer, for a particular context, should be bound to an NF service instance, NF instance, NF service set or NF set. Binding can also be used by the NF consumer to indicate suitable NF consumer instance(s) for notification target instance selection and reselection. It is mandatory, according to 3GPP standards, to support custom HTTP headers for this purpose. These custom HTTP headers include:
  3gpp-Sbi-Binding; and
  3gpp-Sbi-Routing-Binding.

These headers can point to an NF service instance, an NF set, an NF service set, an NF instance, or an NF set. Consumers include this binding information in subsequent requests, which can be used by the SCP in both model C (indirect communications via the SCP without delegated discovery) and model D (indirect communications with delegated discovery), to route subsequent requests or for alternate routing.

Table 1 shown below illustrates different levels of binding indications that can be provided in SBI messages and actions performed by consumer NFs and SCPs to select producer NFs based on the binding level indications.

TABLE 1

Binding Levels and Producer NF Selection

| Level of Binding Indication | The NF consumer/ notification sender/SCP selects | The NF consumer/ notification sender/SCP can reselect e.g. when selected producer is not available | Binding information for selection and re-selection |
|---|---|---|---|
| NF service instance | The indicated NF service instance | An equivalent NF service instance: within the NF service set (if applicable) within the NF instance within the NF set (if applicable) | NF service instance ID, NF service set ID, NF instance ID, NF set ID, service name (NOTE 4) |
| NF service set | Any NF service instance within the indicated NF service set | Any NF service instance within an equivalent NF service set within the NF set (if applicable) (Note 2) | NF service set ID, NF instance ID, NF set ID, service name (NOTE 4) |
| NF Instance | Any equivalent NF service instance within the NF instance. | Any equivalent NF service instance within a different NF instance within the NF Set (if applicable) | NF instance ID, NF set ID, service name (NOTE 4) |
| NF Set | Any equivalent NF service instance within the indicated NF Set | Any equivalent NF Service instance within the NF Set | NF set ID, service name (NOTE 4) |

NOTE 1:
if the binding indication is not available, the NF consumer routes the service request to the target based on routing information available.
(Note 2):
NF service sets in different NFs are considered equivalent if they include same type and variant (e.g. identical NF Service Set ID) of NF Services.
NOTE 3:
If a routing binding indication is not available, the SCP routes the service request to the target based on available routing information.
(NOTE 4):
The service name is only applicable if the binding indication relates to a notification target or If the NF as a NF consumer provides a binding indication for services that the NF produces.

The SCP performs the first routing attempt for an SBI request message based on the 3gpp-Sbi-Target-apiRoot header, if present. Otherwise, the SCP will perform the first routing attempt as per the binding level indication present in the 3gpp-Sbi-Routing-Binding header.

The SCP reselects routes or selects alternate routes, if the 3gpp-Sbi-Routing-Binding header is present, based on the binding level present in 3gpp-Sbi-Routing-Binding header. If the 3gpp-Sbi-Discovery-target-nf-setId is present, then the SCP will select any equivalent NF service instance within the NF set. If neither the 3gpp-Sbi-Routing-Binding header nor the 3gpp-Sbi-Discovery-target-nf-setId is present, the SCP will find the NF-SetId based on the fully qualified domain name (FQDN) present in the 3gpp-Sbi-Target-api-Root header and route to any equivalent NF service instance within the NF set. In all of these cases, without information regarding producer NF instance retry attempts by another SCP, the SCP may attempt to communicate with NF instances with which communications have been attempted, and which report an application error and/or from which responses are not received. Such communications are inefficient and therefore undesirable.

As will be described in detail below, an SCP as described herein may be modified to communicate attempted producer NF instance communication information to another SCP or a consumer NF in a server header carried in a hypertext transfer protocol (HTTP) response message. The server header is defined in 3GPP TS 29.500. As per Table 5.2.2.2-2 of 3GPP TS 29.500, it is mandatory to support HTTP response standard headers, including the server header. The server header is inserted by the originator of an HTTP error response. Table 5.2.2.2-2 of 3GPP TS 29.500 indicates that the server header "may be inserted otherwise," which means that the server header can be inserted in non-error HTTP responses. When inserted by an NF, an SCP or a SEPP, the pattern of the header should be formatted as follows:

"SCP-<SCP FQDN>" for an SCP
"SEPP-<SEPP FQDN>" for a SEPP
"<NFType>-<NF Instance ID>" for an NF As indicated above, the 3GPP TS 29.500 definition of the server header includes parameters indicating the sender of the error response. The 3GPP TS 29.500 definition does not specify that the server header includes attempted producer NF instance communication information. The subject matter described herein expands the server header to include attempted producer NF instance communication information, which indicates producer NF instances (by NF instance IDs) with which communication was attempted, and which responded with an error message or from which no response was received.

Figure 2:
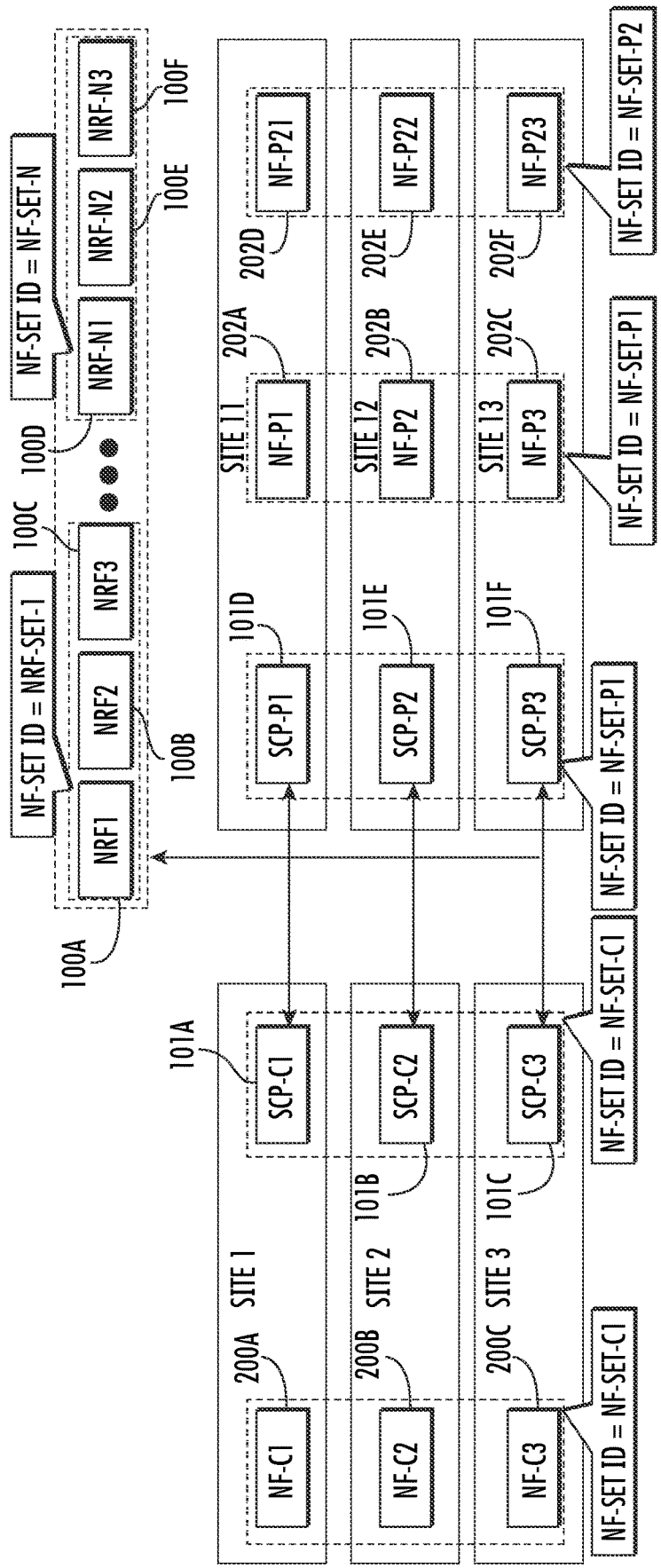
FIG. 2 is a network diagram illustrating an exemplary architecture for indirect communication via SCPs where multiple SCPs are located between NF service consumers and NF service producers.

FIG. 2 illustrates an exemplary reference architecture for the subject matter described herein for conveying attempted producer NF communication information and using the attempted producer NF communication information to route SBI request messages. Referring to FIG. 2, the reference architecture includes consumer NF instances 200A, 200B, and 200C, which form an NF set C1. The reference architecture also includes producer NF instances 202A, 202B, and 202C, which form a producer NF set P1. The architecture also includes producer NF instances 202D, 202E, and 202F, which form a producer NF set P2. SCPs 101A, 101B, and 101C form an SCP set C1. SCPs 101D, 101E, and 101F form another SCP set P1. The architecture further includes NRFs 100A, 100B, and 100C, which form an NRF set NRF-set-1. NRFs 100D, 100E, and 100F form another NRF set NRF-set-2.

In the architecture illustrated in FIG. 2 when an NF service consumer, such as consumer NF instance 200A sends an SBI request message to an NF service producer, such as producer NF instance 202A, the SBI request message is routed by multiple SCPs. If the SCPs to not share attempted producer NF instance communication information, routing inefficiencies will occur. It should also be noted that while the architecture in FIG. 2 is used to illustrate examples of the routing performed by the methodology described herein, the present subject matter is not limited to the architecture in FIG. 2. An architecture where a consumer NF instance sends an SBI request message to a producer NF instance through a single SCP is also intended to be within the scope of the subject matter described herein.

Figure 3:
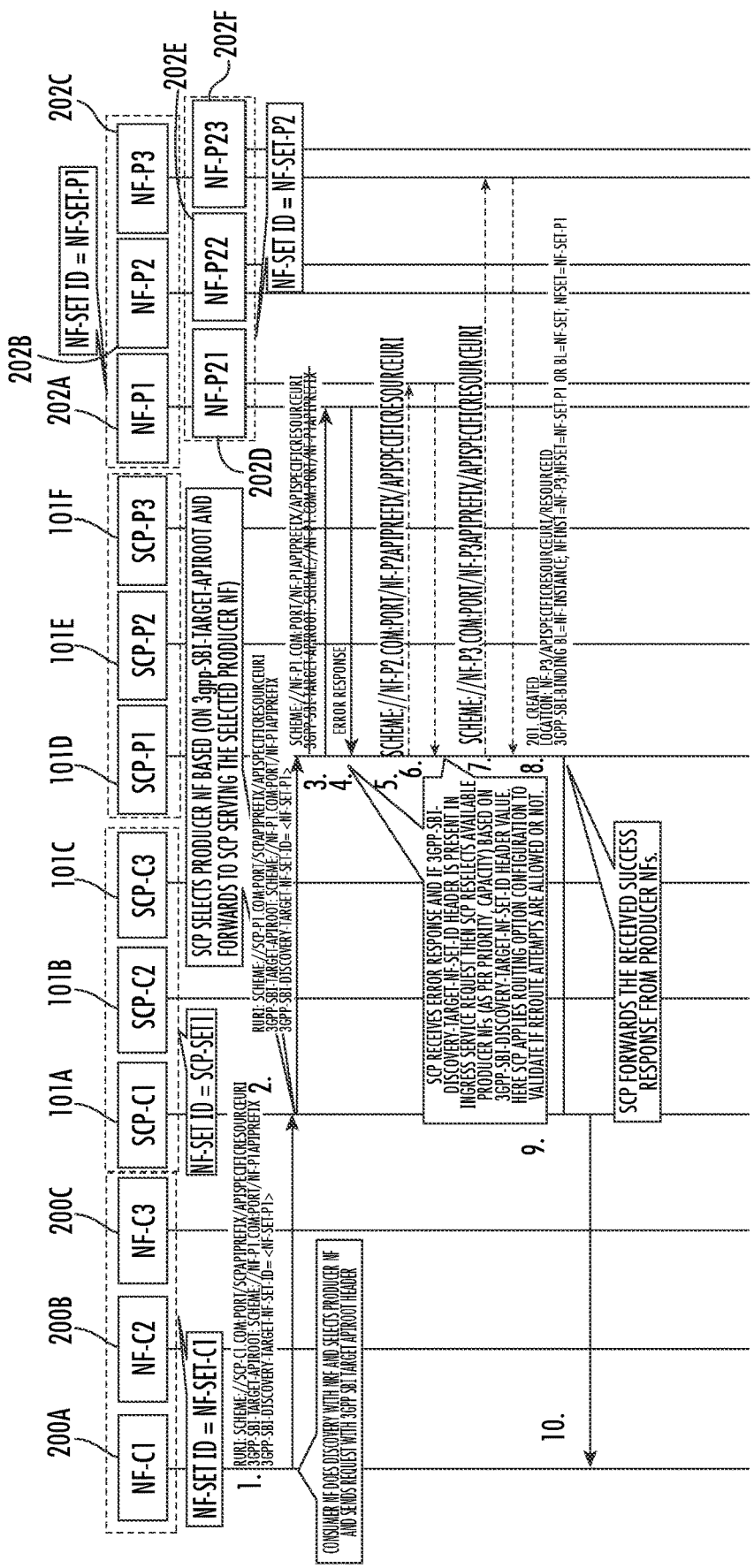
FIG. 3 is a message flow diagram illustrating exemplary messages exchanged for routing service requests from an NF service consumer to NF service producers in the architecture of FIG. 2 where the 3GPP-defined model C for communications is used to route an SBI request message from an NF service consumer to an NF service producer.

One particular communications model to which the subject matter described herein for generating, conveying, and using attempted producer NF instance communication information to route SBI request messages can be applied is model C, as defined in 3GPP TS 23.501. According to model C, a consumer NF instance performs NF discovery to identify one or more target producer NF instances to handle a service request. The consumer NF instance then sends the service request to one of the target producer NF instances using indirect communications via an SCP. FIG. 3 is a message flow diagram illustrating exemplary messages exchanged for routing service requests from an NF service consumer to NF service producers in the architecture of FIG. 2 where model C is used to route an SBI request message from an NF service consumer to an NF service producer. Referring to FIG. 3 because model C is used, it is assumed that consumer NF 200A performs NF discovery with an NRF and identifies a target NF instance within an NF set. The steps for NF discovery are not shown in FIG. 3. In line 1, consumer NF instance 200A generates and sends an SBI request message to SCP 101A. The SBI request message identifies, in the 3gpp-sbi-Target-apiRoot header, producer NF instance 202A, which was identified and selected during NF discovery. In line 2, SCP 101A selects producer NF instance 202A as the target for the SBI request message based on the 3gpp-Sbi-Target-apiRoot header and forwards the SBI request message to the SCP serving the selected producer NF instance, which in FIG. 3 is SCP 101D.

In line 3, SCP 101D forwards the SBI request message to the producer NF instance identified in the 3gpp-Sbi-Target-apiRoot header. In FIG. 3, the target producer NF instance is producer NF instance 202A. In line 4, producer NF instance 202A sends an error response to SCP 101D indicating that producer NF instance 202A has experienced an application error in processing the SBI request message. If the 3gpp-Sbi-Discovery-Target-nf-set-id header was present in the ingress SBI request message in line 2 (which it was in this example), SCP 101D selects alternate available NF instances in the NF set identified in the 3gpp-Sbi-Discovery-Target-nf-set-id header based on priority and capacity. The selection of an alternate NF instance based on the 3gpp-Sbi-Discovery-Target-nf-set-id header is referred to as a reroute attempt. Whether or not to perform reroute attempts based on the 3gpp-Sbi-Discovery-Target-nf-set-id header may be a configurable option of SCP 101D.

In this example, it is assumed that SCP 101D is configured to perform reroute attempts within the NF set identified in the 3gpp-Sbi-Discovery-Target-nf-set-id header. Accordingly, in line 5 of the message flow diagram, SCP 1010 sends the SBI request message to producer NF instance 202B which is in the NF set identified in the 3gpp-Sbi-Discovery-Target-nf-set-id header. In line 6, producer NF instance 202B sends an error response to SCP 1010.

In line 7, SCP 101D sends the SBI request message to producer NF instance 202C. In line 8, producer NF instance 202C returns a 201 Created message, indicating that processing of the SBI request message was successful. In line 9, SCP 101D forwards the 201 Created message to SCP 101A. In line 10, SCP 101A forwards the 201 Created message to consumer NF 200A.

As will be set forth below, the subject matter described herein can be used to reduce unnecessary retry attempts to producer NF instances with which communications were attempted and which responded with application errors and/or from which responses are not received. In communications model C in FIG. 3, if SCP 101D had been unsuccessful in obtaining service for the SBI request message in line 2, SCP 101D could communicate attempted producer NF instance communication information to SCP 101A, and SCP 101A may utilize that information to retry the SBI request message by sending the request to one of SCPs 202D, 202E, and 202F.

Figure 4:
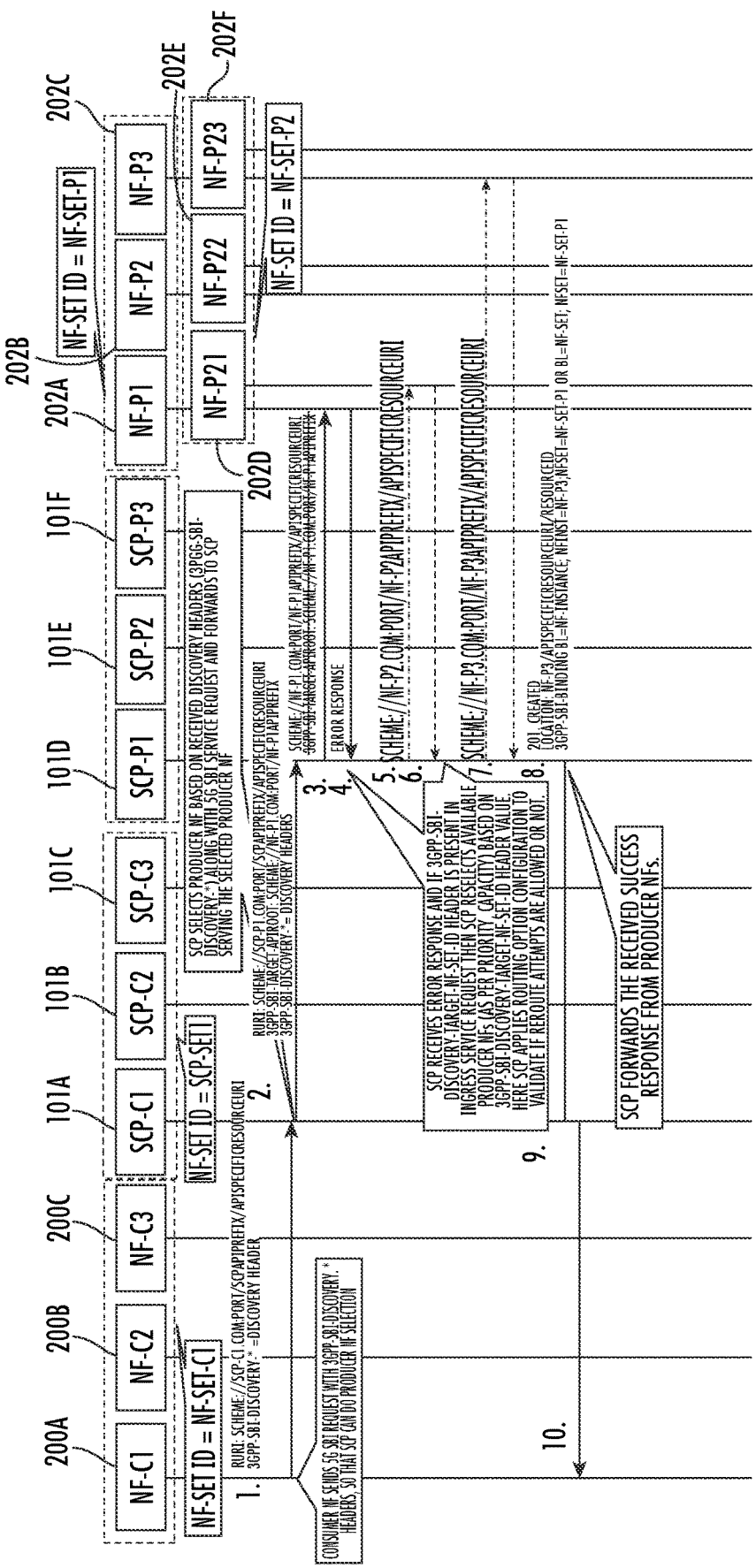
FIG. 4 is a message flow diagram illustrating exemplary messages exchanged for routing SBI service requests from an NF service consumer to NF service producers in the architecture of FIG. 2 where the 3GPP-defined model D for communications is used to route retries of an NF discovery request from an NF service consumer to an NF service producer.

Another routing scenario in which attempted producer NF instance communication information can be used for efficient routing is in indirect communications with delegated discovery, as specified by model D in 3GPP TS 23.500. FIG. 4 is a message flow diagram illustrating exemplary messages exchanged for routing SBI service requests from an NF service consumer to NF service producers in the architecture of FIG. 2 where the 3GPP-defined model D for communications is used to route retries of an NF discovery request from an NF service consumer to an NF service producer. Referring to FIG. 4, in line 1, consumer NF instance 200A generates and sends an SBI request message to SCP 101A. The SBI request message includes the 3gpp-Sbi-Discovery header containing parameters that allow the SCP to perform delegated discovery with the NRF. SCP 101A performs delegated discovery by sending an NF discovery request to an NRF, and receiving a list of NF profiles matching query parameters in the 3gpp-Sbi-Discovery header, and selecting one of the NF profiles for providing the requested service. In line 2, SCP 101A sends the SBI request message to the SCP serving the selected producer NF instance, which in FIG. 4 is SCP 1010.

In line 3, SCP 101D forwards the SBI request message to the producer NF instance identified in the 3gpp-Sbi-Target-apiRoot header in the message received by SCP 101D. The 3gpp-Sbi-Target-apiRoot is marked though in line 3 because the header will not be included in the SBI request message sent to producer NF instance 202A. In FIG. 4, the target producer NF instance is producer NF instance 202A. In line 4, producer NF instance 202A sends an error response to SCP 1010 indicating that producer NF instance 202A its incapable of processing the SBI request message. If the 3gpp-Sbi-Discovery-Target-nf-set-id header was present in the ingress SBI request message in line 2 (which it was in this example), SCP 101D may select alternate available NF instances in the NF set identified in the 3gpp-Sbi-Discovery-Target-nf-set-id header based on priority and capacity.

In this example, it is assumed that SCP 1010 is configured to perform reroute attempts within the NF set identified in the 3gpp-Sbi-Discovery-Target-nf-set-id header. Accordingly, in line 5 of the message flow diagram, SCP 1010 sends the SBI request message to producer NF instance 202B, which is in the NF set identified in the 3gpp-Sbi-Discovery-Target-nf-set-id header. In line 6, producer NF instance 202B sends an error response to SCP 1010.

In line 7, SCP 101D sends the SBI request message to producer NF instance 202C. In line 8, producer NF instance 202C returns a 201 Created message, indicating that processing of the SBI request message was successful. In line 9, SCP 101D forwards the 201 Created message to SCP 101A. In line 10, SCP 101A forwards the 201 Created message to consumer NF 200A.

Using the intelligent SBI request retry/rerouting functionality described herein, in communications model D in FIG. 4, if SCP 101D had been unsuccessful in obtaining service for the SBI request message in line 2, SCP 1010 could communicate attempted producer NF instance communication information to SCP 101A, and SCP 101A may utilize that information to retry the SBI request message by sending the request to one of SCPs 202D, 202E, and 202F.

Figure 5:
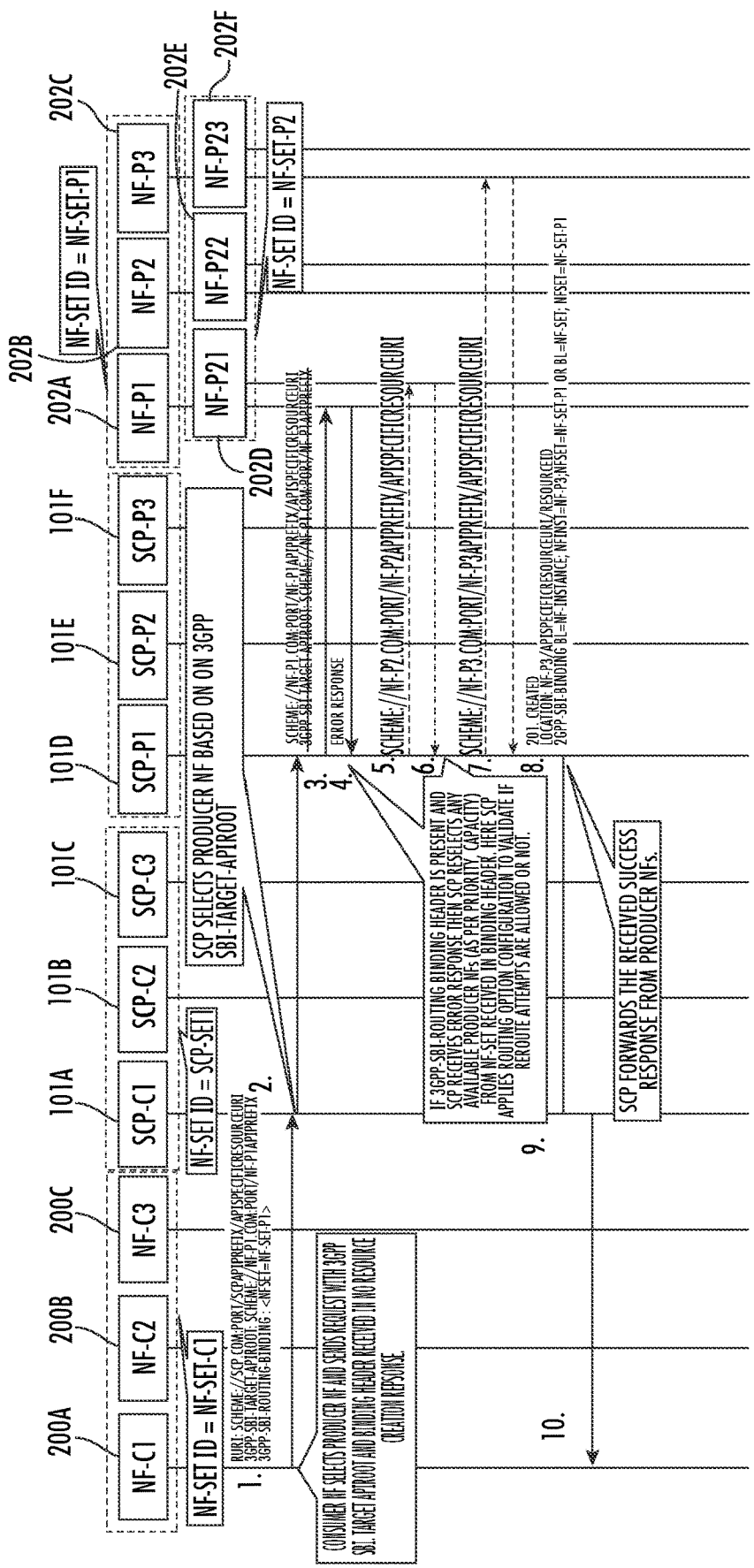
FIG. 5 is a message flow diagram illustrating exemplary messages exchanged for routing SBI service requests from an NF service consumer to NF service producers in the architecture of FIG. 2 where the producer SCP uses an SBI routing binding to route retries of an SBI service request from an NF service consumer to an NF service producer.

Yet another scenario in which the subject matter described herein can be used to increase the efficiency of retry attempts to producer NF instances is when binding headers are used. FIG. 5 is a message flow diagram illustrating exemplary messages exchanged for routing SBI service requests from an NF service consumer to NF service producers in the architecture of FIG. 2 where the producer SCP uses an SBI routing binding to route retries of the SBI service request from an NF service consumer to an NF service producer. Referring to FIG. 5, consumer NF 200A selects a producer NF instance and generates an SBI request message with a 3gpp-Sbi-TargetapiRoot identifying the producer NF instance and a binding header identifying the NF set. In line 1, consumer NF instance 200A sends the SBI request message to SCP 101A. In line 2, SCP 101A selects producer NF instance 202A as the target for the SBI request message based on the 3gpp-Sbi-Target-apiRoot header and forwards the SBI request message to selected to the SCP serving the selected producer NF instance, which in FIG. 5 is SCP 101D.

In line 3, SCP 101D forwards the SBI request message to the producer NF instance identified in the 3gpp-Sbi-Target-apiRoot header. In FIG. 5, the target producer NF instance is producer NF instance 202A. In line 4, producer NF instance 202A sends an error response to SCP 101D indicating that producer NF instance 202A its incapable of processing the SBI request message. If the 3gpp-Sbi-Routing-Binding header was present in the ingress SBI request message in line 2 (which it was in this example), SCP 101D select alternate available NF instances in the NF set identified in the 3gpp-Sbi-Routing-Binding header based on priority and capacity. The selection of an alternate NF instance based on the 3gpp-Sbi-Routing-Binding header is referred to as a reroute attempt. Whether or not to perform reroute attempts based on the 3gpp-Sbi-Routing-Binding header may be a configurable option of SCP 101D.

In this example, it is assumed that SCP 101D is configured to perform reroute attempts within the NF set identified in the 3gpp-Sbi-Routing-Binding header. Accordingly, in line 5 of the message flow diagram SCP 101D sends the SBI request message to producer NF instance 202B which is in the NF set identified in the 3gpp-Sbi-Routing-Binding header. In line 6, producer NF instance 202B sends an error response to SCP 101D.

In line 7, SCP 101D sends the SBI request message to producer NF instance 202C. In line 8, producer NF instance 202C returns a 201 Created message, indicating that processing of the SBI request message was successful. In line 9, SCP 101D forwards the 201 Created message to SCP 101A. In line 10, SCP 101A forwards the 201 Created message to consumer NF 200A.

In communications model using routing bindings for retry attempts in FIG. 5, if SCP 101D had been unsuccessful in obtaining service for the SBI request message in line 2, SCP 101D could communicate attempted producer NF instance communication information to SCP 101A, and SCP 101A may utilize that information to retry the SBI request message by sending the request to one of SCPs 101D, 101E, and 101F.

Figure 6:
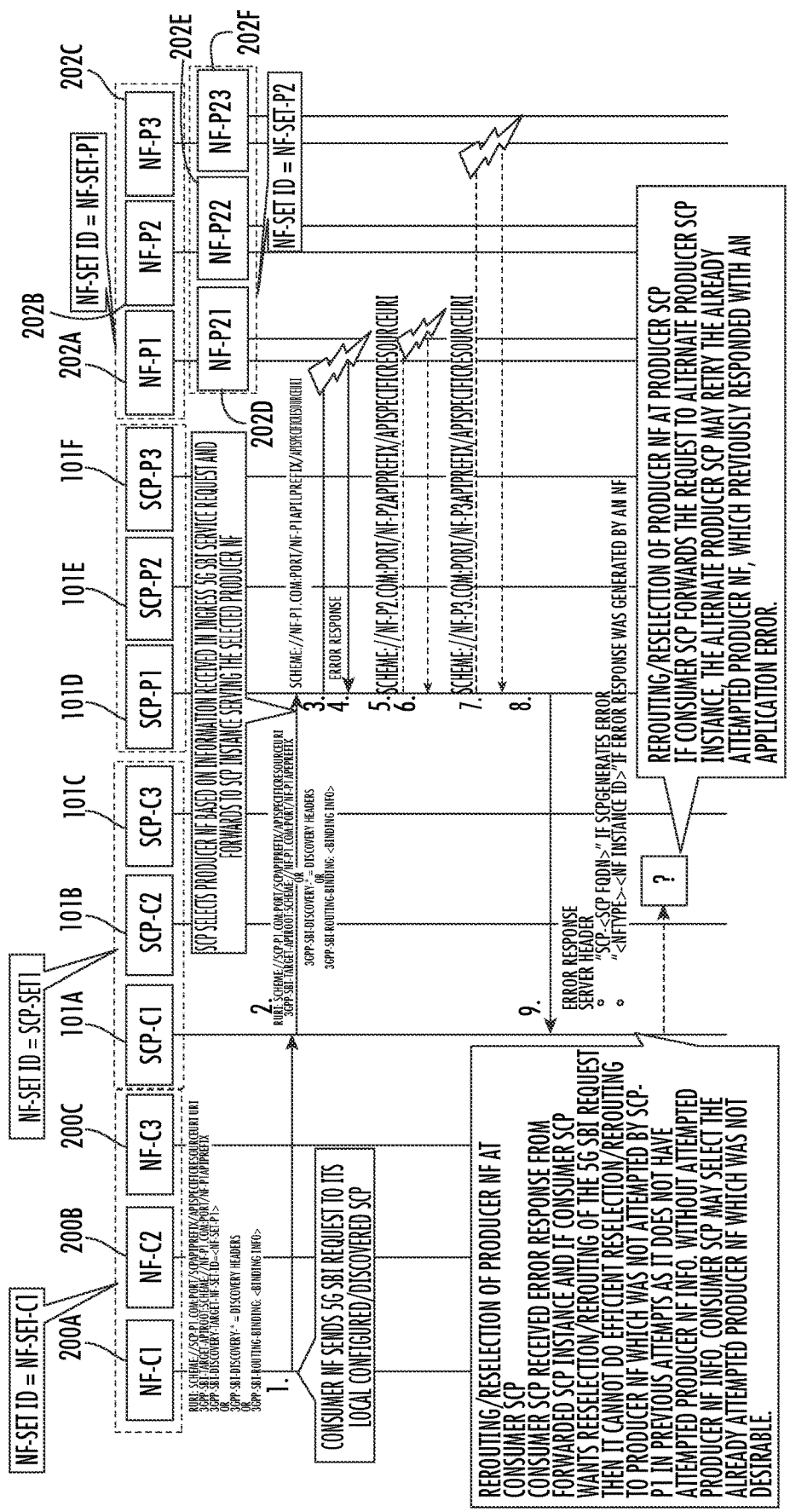
FIG. 6 is a message flow diagram illustrating exemplary messages exchanged for routing SBI service requests from an NF service consumer to NF service producers in the architecture of FIG. 2 where the consumer SCP receives an error response from the producer SCP but not the identities of the producer NF instances with which communication was attempted but was not successful.

FIG. 6 illustrates problems associated with the routing scenarios in FIGS. 3-5 when the attempted producer NF instance communication information is not used to limit retry attempts. Referring to FIG. 6, consumer NF 200A generates an SBI request message. If indirect communications model C is used, consumer NF 200A will perform its own NF discovery, and the SBI request message will include a 3gpp-Sbi-Target-apiRoot header identifying the target producer NF instance. If indirect communications model D is used, consumer NF 200A will not perform its own discovery, and the SBI request message will include 3gpp-Sbi-Discovery headers including query parameters that allow an SCP to perform delegated discovery on behalf of consumer NF 200A. If routing binding is implemented, the SBI request message may include a 3gpp-Sbi-Routing-Binding header identifying a binding (e.g., an NF set or other binding) for the SBI request message.

In the message flow in FIG. 6, in line 1, consumer NF 200A sends the SBI request message to SCP 101A. SCP 101A selects the producer NF based on the information received in the SBI request message and forwards the SBI request message to the SCP serving the producer NF, which in the illustrated example is SCP 101D. In line 3, SCP 1010 sends the SBI request message to producer NF instance 202A. In line 4 producer NF instance 202A sends an error response to SCP 101D. In line 5, SCP 101D sends the SBI request message to producer NF instance 202B. In line 6, producer NF instance 202B sends an error response to SCP 101D. In line 7, producer SCP 1010 sends the SBI request message to producer NF instance 202C. In line 8, producer NF instance 202C sends an error response to SCP 101D.

After line 8, all of the producer NF instances in the NF set identified in the SBI request message have been tried, and a successful response was not received. Accordingly, in line 9, SCP 1010 sends an error response to SCP 101A. The error response includes a server header that identifies the FQDN of SCP 1010 or the NF type and NF instance ID if the error response was generated by an NF other than an SCP. The server header does not include information identifying producer NF instances with which communication was attempted and which responded with an application error or from which responses were not received. Consumer SCP 101A receives the error response from SCP 101D, and because the error response does not include attempted producer NF instance communication information, SCP 101A or consumer NF 200A may reselect one of the NF instances in set 1 for a retry of the SBI request message in line 1. If SCP 101A sends the SBI request message to an alternate producer SCP, such as producer SCP 101E or 101F, the producer SCP will not have the information about the attempted producer NF communications and may retry to communicate with the producer NF instances with which communications were attempted and that responded with an application error or from which responses were not received.

In order to avoid or at least reduce the likelihood of the routing inefficiency illustrated in FIG. 6, an SCP may collect attempted producer NF instance communication information and, communicate that information to the sender (e.g. an SCP or a consumer NF) of an SBI request message so that the sender can utilize the information to avoid selection of a producer NF instance with which communications were attempted, but which responded with an application error or from which a response was not received. The sender (the consumer NF or the SCP serving the consumer NF) will include the attempted producer NF instance communication information that it sends to the producer SCP so that the producer SCP will not attempt communications with a producer NF instance identified in the attempted producer NF instance communication information.

In general, a consumer NF will send an SBI request message to a local configured/discovered producer NF or offload the selection of the producer NF to an SCP. For SBI request messages after an initial request, the consumer NF may send binding information received from a producer NF in an SBI resource creation response. If the consumer NF sends an SBI request message to a consumer SCP, the consumer SCP may select a producer NF instance based on information received in the ingress SBI service request and forward the SBI service request to an SCP instance serving the selected producer NF instance.

The producer SCP attempts routing to the selected producer NF instance. The producer SCP may also attempt rerouting to alternate producer NF instance, and, based on whether the attempts are successful, the producer SCP may send a success or error response to the consumer SCP. If the producer SCP sends an error response, the producer SCP may send attempted producer NF communication info along with the error response, so that the consumer SCP is aware of attempted producer NF instances, and the consumer SCP can ignore all attempted producer NFs during rerouting/ reselection of producer NFs.

The producer SCP may be enhanced to add the attempted producer NF instance communication information in an enhanced server header after the SCP FQDN in the error response. When inserted by a producer SCP, the server header may be formatted as follows:

"SCP-<SCP FQDN><NF instance Ids of all attempted producers in reverse order of attempt>"

The consumer SCP may receive the error response along with the attempted producer NF communication info from the producer SCP. If the consumer SCP wants to perform reselection/rerouting of the 5G SBI request message, the consumer SCP may use the attempted producer NF instance communication information to ignore all attempted producer NFs during rerouting/reselection of producer NFs. Using the attempted producer NF instance communication information at the consumer SCP, the consumer SCP can do efficient reselection of/rerouting to a producer NF instance with which communication was not attempted by the producer SCP in the previous attempt to obtain the service request in the previous SBI request message. The consumer SCP may also be enhanced to add attempted producer NF instance communication information in a custom header of the retry of the SBI request that is forwarded to the same or an alternate selected producer SCP. In one example, the custom header may be formatted as follows:

<NF instance Ids of all attempted producers in reverse order of attempt>

One point to highlight is that with proposed solution, the consumer SCP is able to do efficient reselection/rerouting to producer NF instances that did not send error responses to the producer SCP or for which responses were not received by the producer SCP in the previous attempt to obtain the service requested by the SBI request message.

The consumer SCP may reroute the SBI request message to the same or a different producer SCP from the SCP to which the initial SBI request message was sent. The request may include the custom header including the attempted producer NF communications information. The producer SCP will utilize the attempted producer NF instance communication information to select a producer NF instance whose NF instance ID is not included in the list of attempted producer NF instance IDs in the custom header received in the SBI request message.

Figure 7:
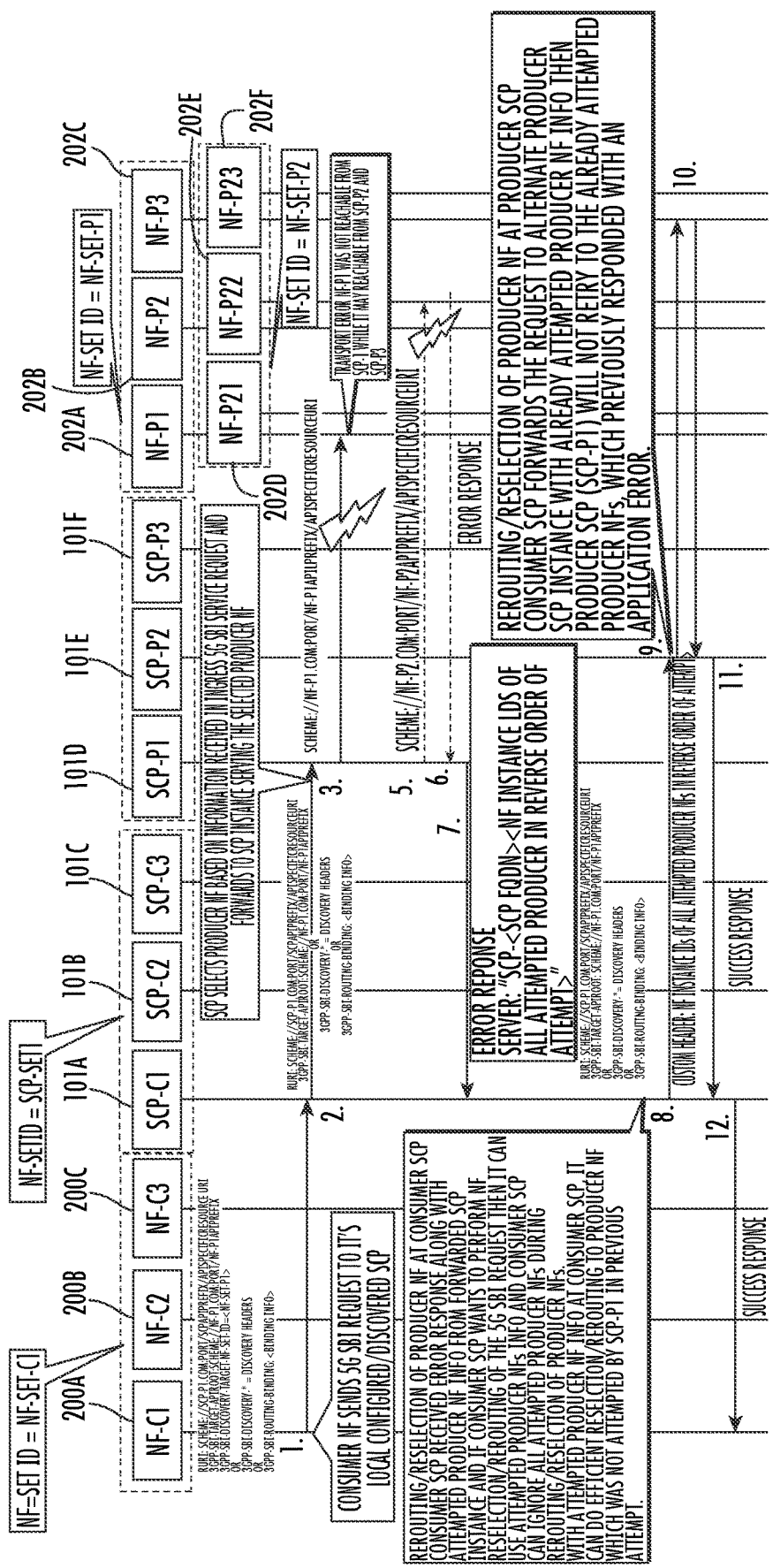
FIG. 7 is a message flow diagram illustrating exemplary messages exchanged for routing SBI service requests from an NF service consumer to NF service producers in the architecture of FIG. 2 where the consumer SCP receives an error response from the producer SCP along with the identities of the producer NF instances with which communication was attempted but was not successful, where the consumer SCP uses the attempted producer NF instance communication information to select an NF instance that was not one of the NF instances with which communication was attempted but was not successful.

FIG. 7 is a message flow diagram illustrating the generation, conveyance, and use of attempted producer NF instance communication information in routing SBI request messages. Referring to FIG. 7, the improved routing scenario applies to indirect communications without delegated discovery according to model C, indirect communications with delegated discovery according to model D, and routing using bindings. In line 1, consumer NF 200A sends an SBI request message to SCP 101A. If indirect communications model C is used, consumer NF 200A will perform its own NF discovery, and the SBI request message will include a 3gpp-Sbi-Target-apiRoot header identifying the target producer NF instance. If indirect communications model D is used, consumer NF 200A will not perform its own discovery, and the SBI request message will include 3gpp-Sbi-Discovery headers including query parameters that allow an SCP to perform delegated discovery on behalf of consumer NF 200A. If routing binding is implemented, the SBI request message may include a 3gpp-Sbi-Routing-Binding header identifying a binding (e.g., an NF set or other binding) for the SBI request message.

SCP 101A selects the producer NF based on the information received in the SBI request message and forwards the SBI request message to the SCP serving the producer NF, which in the illustrated example is SCP 101D. In line 3, SCP 101D sends the SBI request message to producer NF instance 202A. In this case, a transport error occurs, and the SBI request message does not reach producer NF instance 202A. The absence of a response to an SBI request message may cause SCP 101D to put the identity of producer NF instance 202A in a list of attempted producer NF instance communication information that will be conveyed to consumer NF 101A.

In line 5, SCP 101D sends the SBI request message to producer NF instance 202B. In line 6, producer NF instance 202B sends an error response to SCP 101D. Although not illustrated in FIG. 7, producer SCP 101D may also send the SBI request message to producer NF instance 202C and may receive an error response from producer NF instance 202C.

In line 7, SCP 101D sends an error response to SCP 101A. The error response includes a server header. According to an aspect of the subject matter described herein, the server header is modified to include the NF instance IDs of all producer NF instances with which communication was attempted and which responded with an application error message and for which a response was not received. The NF instance IDs, in one example, may be arranged in a list in reverse order of communication attempt. In the example illustrated in FIG. 7, the list would include the NF instance ID of producer NF instance 202A and producer NF instance 202B. The list would also include the NF instance ID of producer NF instance 202C if producer NF instance 202C had responded with an application error or failed to deliver a response to SCP 101D. The server header may include the FQDN of SCP 101D.

SCP 101A receives the error response with the attempted producer NF instance communication information. Rather than re-attempting communications with producer NF instance 202B, SCP 101A may generate an SBI request message (which may be a retry or reattempt of the SBI request message in line 1), and may include, in the SBI request message, information identifying one of producer NF instances 202D, 202E, or 202F, and including a custom header with the attempted producer NF instance communication information identifying producer NF instance 202B as an NF instance with which communications for this SBI request message should not be reattempted. For example, if indirect communications according to model C are implemented, the SBI request message may include a 3gpp-Sbi-Target-apiRoot header identifying one of NF instances 202A, 202C, 202D, 202E, or 202F. If indirect communications according to model D are implemented, the SBI request message may include a 3gpp-Sbi-Discovery header including query parameters for identifying one of NF instances 202A, 202C 202D, 202E, or 202F. If routing binding is implemented, the SBI request message may include a 3gpp-Routing-Binding header including query parameters for identifying one of NF instances 202A, 202C, 202D, 202E, or 202F. In all three cases, the SBI request message will also include the custom header that includes the attempted producer NF instance communication information identifying producer NF instance 202B as an NF instance with which communications should not be reattempted for this SBI request message.

In line 8, SCP 101A sends the SBI request message with the custom header identifying producer NF instance 202B to SCP 101E. SCP 101E receives the request and reads the 3gpp-Sbi-Target-apiRoot header, 3gpp-Sbi-Discovery header, or 3gpp-Routing-Binding header. SCP 101E will also read the identity of producer NF instance 202B in the custom header. SCP 101E will route the request to the producer NF identified in the 3gpp-Sbi-Target-apiRoot header, 3gpp-Sbi-Discovery header, or 3gpp-Routing-Binding header but will not attempt to send the SBI request message to the producer NF identified in the custom header. In the illustrated example, in line 9, SCP 101E sends the SBI request message to producer NF instance 202C. In line 10, producer NF instance 202C sends a success response to SCP 101E. In line 11, SCP 101E sends the success response to SCP 101A. In line 12, SCP 101A sends the success response to consumer NF 200A.

In the example in FIG. 7, the consumer SCP 101A uses the attempted producer NF instance communication information to select an alternate producer NF to handle the reattempt to obtain the service requested by the original SBI request message. In an alternate implementation, a consumer NF, such as consumer NF 200A may utilize the attempted producer NF instance communication information to select an alternate producer NF to handle of the reattempt to obtain the service requested by the original SBI request message.

Figure 8:
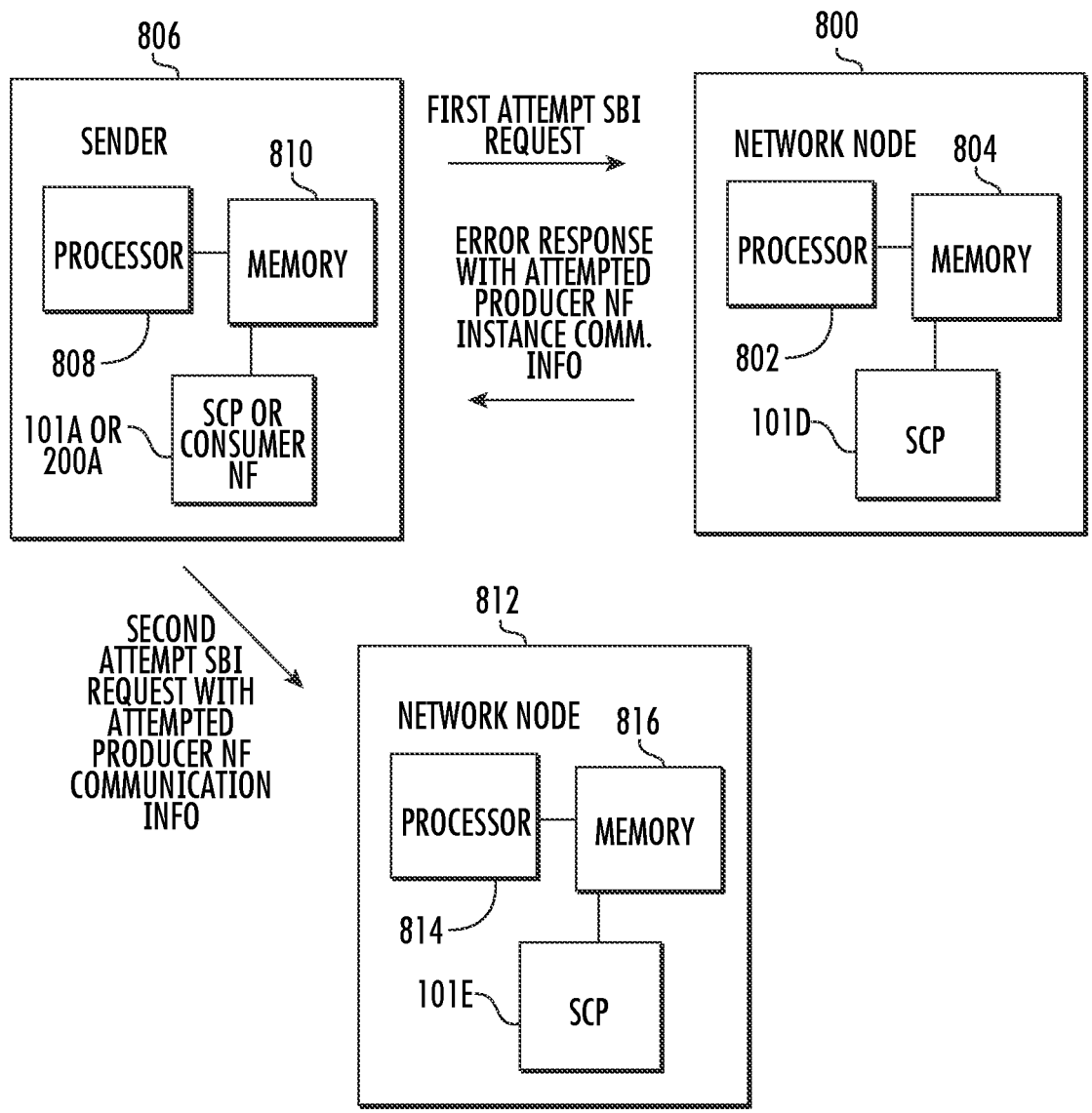
FIG. 8 is a block diagram illustrating an exemplary architecture of a system for generating, conveying, and using attempted producer NF instance communication information to route SBI request messages.

FIG. 8 is a block diagram of a system for generating, conveying, and using attempted producer network function (NF) communication information. Referring to FIG. 8, the system includes a network node 800 including at least one processor 802 and a memory 804. The system further includes a first SCP 1010 implemented using computer executable instructions stored in memory 804 and executed by processor 802 for controlling network node 800 to receive, from a sender 806, a first service based interface (SBI) request message, attempt to obtain a service requested by the first SBI request message from at least one producer NF instance, receive at least one error response from the at least one producer NF instance, generate, from the at least one error response, attempted producer NF instance communication information, and communicate, to the sender, the attempted producer NF instance communication information.

Sender 806 may also include at least one processor 808 and memory 810. Sender 806 may include a second SCP or consumer NF 101A or 200A implemented using computer executable instructions stored in memory 810 and executed by processor 808 to control sender 806 to implement second SCP 101A or consumer NF 200A. First SCP 101D sends the attempted producer NF instance communication information to sender 806. Sender 806 may utilize the attempted producer NF instance communication information to select a producer NF (by avoiding already attempted producer NFs identified in the attempted producer NF instance communication information). Sender 806 may send a second SBI request message comprising a re-attempt to obtain the service requested by the first SBI request message to a network node 812 implementing a third SCP 101E. The second SBI request message may also include the attempted producer NF communications information. Network node 812 may also include at least one processor 814 and memory 816. Third SCP 101E may be implemented using computer executable instructions stored in memory 816 and executed by processor 814. Third SCP 101E may receive the request and utilize the attempted producer NF instance communication information to select a producer SCP to provide the service requested by the second SBI request message and forward the second SBI request message to the selected producer NF instance.

Figure 9:
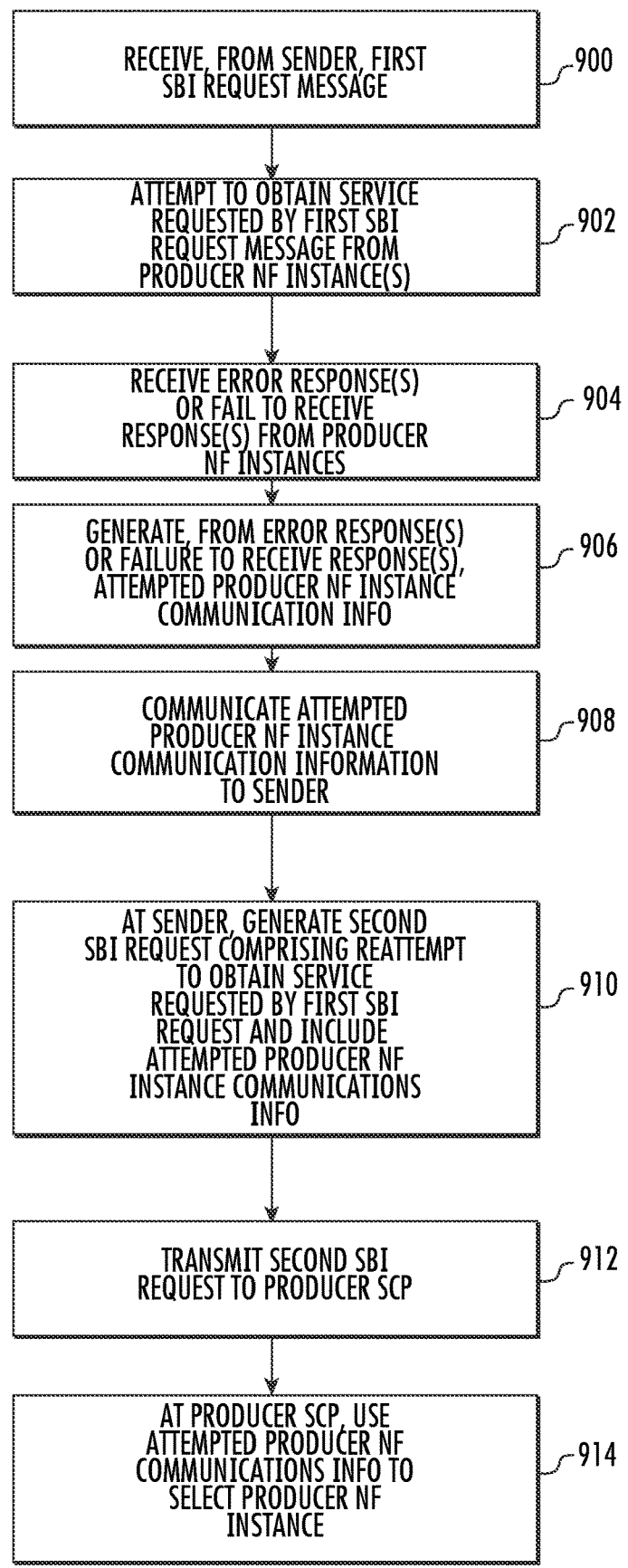
FIG. 9 is a flow chart illustrating an exemplary process for generating, conveying, and using attempted producer NF instance communication information to route SBI request messages.

FIG. 9 is a flow chart illustrating an exemplary process for generating, conveying, and using attempted producer NF communications information. Referring to FIG. 9, the process includes steps performed at a first service communication proxy (SCP). In step 900, the process includes receiving, from a sender, a first service based interface (SBI) request message. For example, SCP 101D may receive and SBI request message from a consumer NF, such as consumer NF 200A or from another SCP, such as SCP 101A.

In step 902, the process includes attempting to obtain a service requested by the first SBI request message from at least one producer NF instance. For example SCP 1010 may send the SBI request message to producer NFs until a success response is received or until all producer NFs in an NF set have returned an error response or not responded to the SBI request message.

In step 904, the process includes receiving at least one error response from the at least one producer NF instance or failing to receive a response from the at least one producer NF instance. For example, SCP 101D may receive at least one error response from a producer NF instance that receives the SBI request message but is currently incapable of providing the service requested by the SBI request message. Alternatively, or in addition to receiving error responses, SCP 101D may fail to receive a response from one or more of the producer NF instances to which the first SBI request was transmitted, e.g., due to a transport error between SCP 101D and the producer NF instance(s).

In step 906, the process includes generating, from the at least one error response or the failing to receive a response from the at least one producer NF instance, attempted producer NF instance communication information. For example SCP 101D may generate a list of producer NF instance IDs of producer NF instances with which communications were attempted and which returned error responses and from communications were attempted and a response was not received.

In step 908, the process includes communicating, to the sender, the attempted producer NF instance communication information. For example, SCP 101D may generate and send an error response to the SCP or consumer NF that sent the SBI request message. SCP 1010 may include, in the error response, a server header including the list of producer NF instances with which communications were attempted and which responded with an error response or from which a response was not received.

In step 910, the process includes, at the sender, generating a second SBI request message comprising a re-attempt to obtain service requested by the first SBI request message and including, in the second SBI request message, the attempted producer NF communications information. For example, SCP 101A or consumer NF 200A may generate a second SBI request message and include a custom header in the second SBI request message with the attempted producer NF communications information.

In step 912, the process includes transmitting the second SBI request message to a producer SCP. For example, consumer NF 200A or SCP 101A may transmit the second SBI request message to producer SCP 101D, producer SCP 101E, or producer SCP 101F.

In step 914, the process includes, at the producer SCP, using the attempted producer NF communications information to select a producer NF instance. For example, producer SCP 101D, 101E, or 101F may utilize the attempted producer NF instance communications information to avoid selecting a producer NF instance identified in the custom header received from consumer NF 200A or SCP 101A.

Exemplary advantages of the subject matter described herein include efficient reselection/rerouting to producer NF instances that did not return error responses in previous attempts to obtain a service. By excluding producer NF instances that responded with an error message or from which no response was received in response to a previous service request, the number of retries to obtain the service may be reduced. If an SBI request message is sent to an alternate producer SCP than the SCP that handled an initial SBI request message, because the SBI request message includes the custom header with the attempted producer NF instance communication information, the alternate producer SCP is able to perform efficient reselection/rerouting to producer NFs that did not return error responses or from which a response was not received in response to the initial SBI request message. The solution described herein can enable efficient re-routing of SBI request messages from any of the NFs illustrated in FIG. 1 and/or other NFs, including, but not limited to an SEPP, a PCF, a binding support function (BSF), an NSSF, an NEF, an NRF, and a UDR.

The disclosure of each of the following references is incorporated herein by reference in its entirety.

REFERENCES 1. 3$^{rd}$ Generation Partnership Project; Technical Specification Group Core Network and Terminals; Technical Realization of Service Based Architecture (5GS); Stage 3 (Release 17) 3GPP TS 23.500 V17.4.0 (2021-09)
2. 3$^{rd}$ Generation Partnership Project; Technical Specification Group Services and System Aspects; System Architecture for the 5G System (5GS); Stage 2 (Release 17) 3GPP TS 23.501 V17.2.1 (2021-09)
3. 3$^{rd}$ Generation Partnership Project; Technical Specification Group Services and System Aspects; Procedures for the 5G System (5GS); Stage 2 (Release 17) 3GPP TS 23.502 V17.2.0 (2021-09)
4. 3$^{rd}$ Generation Partnership Project; Technical Specification Group Croup Core Network and Terminals; Principles and Guidelines for Services Definitions; Stage 3 (Release 17) 3GPP TS 29.501 V17.3.1 (2021-09)
5. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
6. 3$^{rd}$ Generation Partnership Project; Technical Specification Group Services and System Aspects; Security architecture and procedures for 5G System (5GS) (Release 17) 3GPP TS 33.501 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating, conveying, and using attempted producer network function (NF) instance communication information, the method comprising:
    at a first service communication proxy (SCP)
        receiving, from a sender, a first service based interface (SBI) request message;
        attempting to obtain a service requested by the first SBI request message from a plurality of producer NF instances;
        receiving an error response or failing to receive a response from each of the producer NF instances;
        generating, from the error responses or the failing to receive responses from the producer NF instances, a list of NF instance IDs of the producer NF instances with which communication was attempted and failed; and
        communicating, to the sender, the list of producer NF instance IDs of the producer NF instances with which communication was attempted and failed, wherein communicating the list to the sender includes communicating the list in an error response transmitted to the sender.

2. The method of claim 1 wherein the sender comprises a consumer NF and the method further comprises, at the consumer NF, using list to avoid selecting any of the producer NF instances having NF instance IDs in the list, wherein the consumer NF instance selects a producer NF instance whose NF instance ID is not in the list for handling a second SBI request message comprising a reattempt in obtaining a service requested by the first SBI request message.

3. The method of claim 2 comprising, at the consumer NF, transmitting the second SBI request message including the list to a second SCP, and, at the second SCP, utilizing the list to avoid selecting any of the producer NF instances whose NF instance IDs are in the list and wherein the second SCP selects a producer NF instance whose NF instance ID is not in the list for providing the service requested by the second SBI request message and transmits the second SBI request message to the selected producer NF instance.

4. The method of claim 1 wherein the sender comprises a second SCP and the method further comprises, at the second SCP, using the list to avoid selecting any of the producer NF instances whose NF instance IDs are in the list and wherein the second SCP selects a producer NF instance whose NF instance ID is not in the list for handling a second SBI request message comprising a reattempt in obtaining a service requested by the first SBI request message and transmits the second SBI request message including the list to a third SCP.

5. The method of claim 4 comprising, at the third SCP, utilizing the list to avoid selecting any of the producer NF instances whose NF instance IDs are in the list and wherein the third SCP selects a producer NF instance whose NF instance ID is not in the list for providing the service requested by the second SBI request message, and transmitting the second SBI request message to the selected producer NF instance.

6. The method of claim 1 wherein communicating the list in the error response comprises including the list in a server header of the error response.

7. The method of claim 1 comprising, at the sender, generating a second SBI request message comprising a reattempt to obtain the service requested by the first SBI request message.

8. The method of claim 7 comprising, including, in the second SBI request message, a custom header including the list.

9. A system for generating, conveying, and using attempted producer network function (NF) instance communication information, the system comprising:
a network node including at least one processor and a memory; and
a service communication proxy (SCP) implemented using computer executable instructions stored in the memory and executed by the at least one processor for receiving, from a sender, a first service based interface (SBI) request message, attempting to obtain a service requested by the first SBI request message from a plurality of producer NF instances, receiving at least one error response or failing to receive a response from the producer NF instances, generating, from the responses or the failing to receive responses from the producer NF instances, a list of NF instance IDs of the producer NF instances with which communication was attempted and failed, and communicating, to the sender, the list of NF instance IDs of the producer NF instances with which communication was attempted and failed, wherein the first SCP is configured to communicate the list to the sender in an error response transmitted to the sender.

10. The system of claim 9 comprising the sender, wherein the sender comprises a consumer NF and the consumer NF is configured to use the list to avoid selecting any of the producer NF instances having NF instance IDs in the list, wherein the consumer NF instance selects a producer NF instance for handling a second SBI request message comprising a reattempt in obtaining a service requested by the first SBI request message.

11. The system of claim 10 comprising a second SCP, wherein the consumer NF is configured to transmit the second SBI request message including the list to the second SCP and the second SCP is configured to utilize the list to avoid selecting any of the producer NF instances having NF instance IDs in the list, wherein the second SCP selects a producer NF instance whose NF instance ID is not in the list for providing the service requested by the second SBI request message, and transmits the second SBI request message to the selected producer NF instance.

12. The system of claim 9 comprising the sender, wherein the sender comprises a second SCP configured to use list to avoid selecting any of the producer NF instances having NF instance IDs in the list, wherein the consumer second SCP selects a producer NF instance whose NF instance ID is not in the list for handling a second SBI request message comprising a reattempt in obtaining a service requested by the first SBI request message and transmits the second SBI request message including the list to a third SCP.

13. The system of claim 12 comprising the third SCP, wherein the third SCP is configured to utilize the list to avoid selecting any of the producer whose NF instance IDs are in the list and wherein the third SCP is configured to select a producer NF instance whose NF instance ID is not in the list for providing the service requested by the second SBI request message and transmit the second SBI request message to the selected producer NF instance.

14. The system of claim 11 wherein the first SCP is configured to include the list in a server header of the error response.

15. The system of claim 9 comprising the sender, wherein the sender is configured to generate a second SBI request message comprising a re-attempt to obtain the service requested by the first SBI request message, and, to include, in the second SBI request message, a custom header including the list.

16. One or more non-transitory computer readable media comprising computer-executable instructions that when executed by a processor of a computer control the computer to perform steps comprising:
receiving, from a sender, a first service based interface (SBI) request message;
attempting to obtain a service requested by the first SBI request message from a plurality of producer network function (NF) instances;
receiving an error response or failing to receive a response each of the producer NF instances;
generating, from the error responses or the failing to receive a responses from the producer NF instances, a list of NF instance IDs of the producer NF instances with which communication was attempted and failed; and
communicating, to the sender, the list of producer NF instance IDs of the producer NF instances with which communication was attempted and failed, wherein communicating the list to the sender includes communicating the list in an error response transmitted to the sender.

* * * * *

UNITED STATES PATENT AND TRADEMARK OFFICE
CERTIFICATE OF CORRECTION

| | |
|---|---|
| PATENT NO. | : 11,831,732 B2 |
| APPLICATION NO. | : 17/524711 |
| DATED | : November 28, 2023 |
| INVENTOR(S) | : Singh et al. |

It is certified that error appears in the above-identified patent and that said Letters Patent is hereby corrected as shown below:

In the Drawings

In Figure 6, Line 5 of text box adjacent to step 9, replace "REESELECTION" with "RESELECTION".

In Figure 6, in step 9, replace "SCPGENERATES" with "SCP GENERATES".

In Figure 7, in Line 1 of the text box below step 7, replace "REPONSE" with "RESPONSE".

In Figure 7, in Line 2 of the text box below step 7, replace "LDS" with "IDS".

In Figure 7, in Line 8 of the text box for step 8, replace "RESELCTION" with "RESELECTION".

In Figure 7, in Line 10 of the text box for step 8, replace "RESELCTION" with "RESELECTION".

In the Specification

Column 9, Line 35, replace "(Note 2)" with "(NOTE 2)".

Column 9, Line 47, replace "(Note 2):" with "NOTE 2:".

Column 9, Line 50, replace "(N 4)" with "NOTE 4:".

Column 11, Line 49, replace "1010" with "101D".

Column 11, Line 53, replace "1010" with "101D".

Column 12, Line 27, replace "1010" with "101D".

Column 12, Line 36, replace "1010" with "101D".

Signed and Sealed this
Seventeenth Day of December, 2024

Derrick Brent
*Acting Director of the United States Patent and Trademark Office*

Column 12, Line 46, replace "1010" with "101D".

Column 12, Line 50, replace "1010" with "101D".

Column 12, Line 61, replace "1010" with "101D".

Column 14, Line 13, replace "1010" with "101D".

Column 14, Line 19, replace "1010" with "101D".

Column 14, Line 25, replace "1010" with "101D".

Column 14, Line 27, replace "1010" with "101D".

Column 17, Line 39, replace "1010" with "101D".

Column 18, Line 21, replace "1010" with "101D".

Column 18, Line 51, replace "1010" with "101D".

In the Claims

Column 20, Claim 2, Line 3, insert --the-- before "list".

Column 21, Claim 12, Line 2, insert --the-- before "list".

Column 22, Claim 14, Line 1, replace "11" with "9".

Column 22, Claim 16, Line 13, delete "a" before "responses".